Dec. 29, 1964 H. E. F. C. LINGENBRINK 3,163,414

COMPUTER SYSTEMS

Filed Jan. 24, 1962 2 Sheets-Sheet 1

INVENTOR.
HERMANN E.F.C. LINGENBRINK
BY
F.D.Pnge
ATTORNEY

Dec. 29, 1964 H. E. F. C. LINGENBRINK 3,163,414

COMPUTER SYSTEMS

Filed Jan. 24, 1962 2 Sheets-Sheet 2

INVENTOR.
HERMANN E. F. C. LINGENBRINK
BY
F. D. Prager
ATTORNEY

United States Patent Office 3,163,414
Patented Dec. 29, 1964

3,163,414
COMPUTER SYSTEMS

Hermann E. F. C. Lingenbrink, Hilltown, Pa., assignor to Philco Corporation, Philadelphia, Pa., a corporation of Delaware Filed Jan. 24, 1962, Ser. No. 168,385
2 Claims. (Cl. 271—27)

Figures 1, 2:
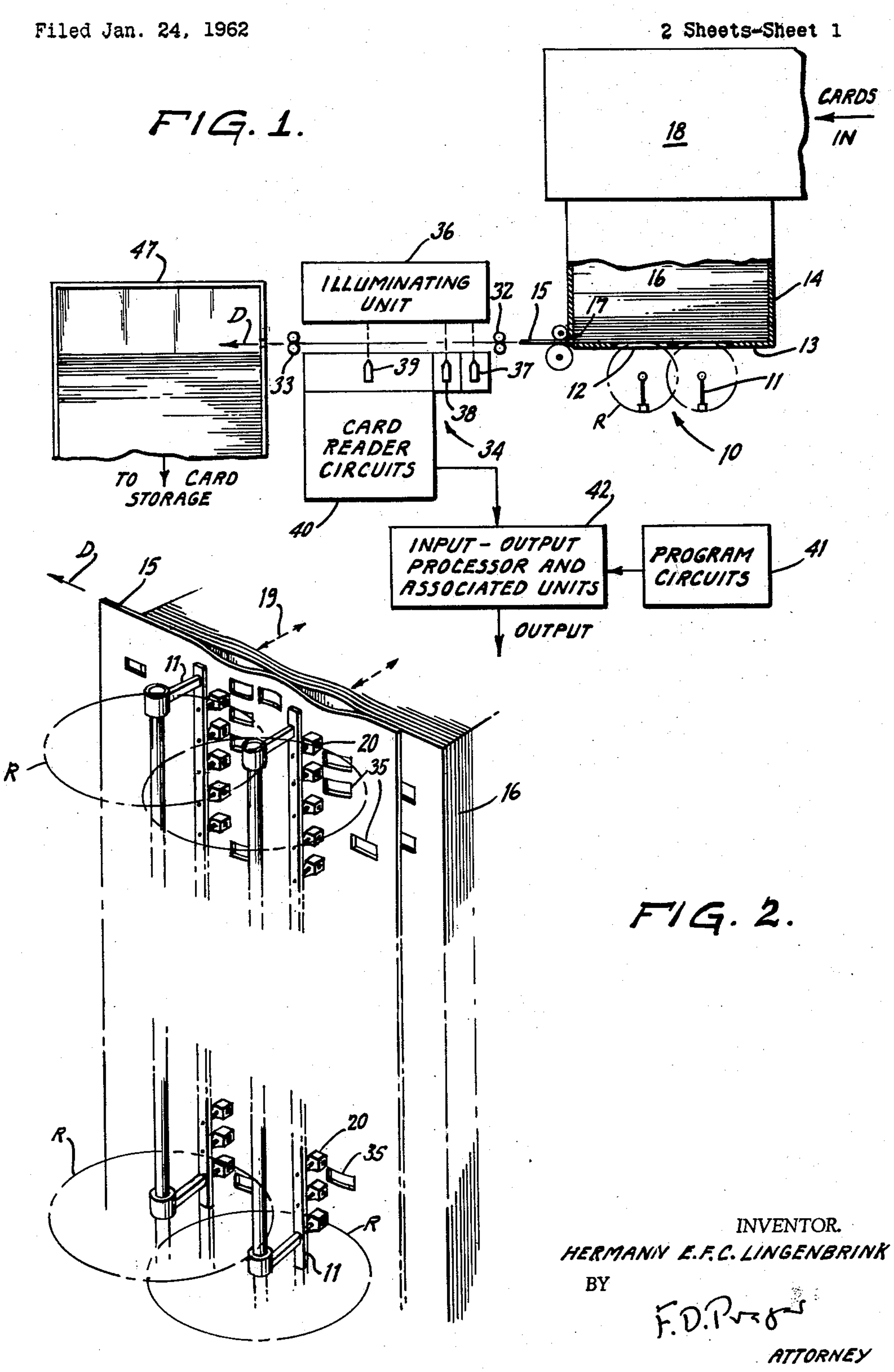

My invention relates to a method of and apparatus for manipulating computer cards and similar documents. It serves to feed the documents from a file or card stack to a computer or data processor.

Card-feeding apparatus of this general type is needed in various devices and systems for utilizing large masses of data, provided by the cards or checks, and for brief reference I will call any such device, system, computer, or processor a card reader.

The invention relates more specifically to an electronic high speed card reader. In using this latter term I mean a reader wherein documents are received for electronic scanning and at a substantially higher speed than they can be dealt out by hand, also at a higher speed than is allowed and achieved in automatic printing presses and the like.

Although much effort and ingenuity has gone into the development of methods for the mechanical moving of papers, cards and checks, the speed of such motion has never heretofore matched the reading speed attainable by an electronic reader. Various attempts have previously been made to close or at least to narrow this gap, and this has also been the general object of my invention.

In pursuance of this objective, I have provided for greatly accelerated and yet controlled and reliable feeding of documents from a stack, by the use of novel cooperation between (1) cyclic motion of a card picker, especially of the surface engaging type, which applies a vibratory condition to the stack and (2) the use of a permanent force field travelling with the picker and selectively acting upon a selected front portion of the stack.

Thus, in lieu of the usual, purely frictional use of a travelling contactor, means are provided for maintaining a card-engaging force field, associated with the card contactor. Advantageously, this field is of the aerodynamic type. It remains permanently upon and travels with the contactor and its force is used cyclically, to attract each successive front card of the card stack to the contactor. This action interferes selectively with the above-mentioned vibratory condition of the card file, thereby allowing only non-frontal cards freely to vibrate in a direction away from the contactor.

The consequent application of a selective card attracting force is facilitated by the free entry of air, at atmospheric pressure, into the stack of computer cards. This entry of air is promoted by the card perforations, which may provide the bits of computer data, and it in turn leads to rapid performance of the minute but important "lifting off" of the front card, for selective adherence of that card to the picker while the other cards vibrate in a direction away from the picker.

The invention employs a travelling card picker of the surface-engaging type (as distinguished from the type using a so-called picker knife operation, that is, an oscillating edge structure or knife beating against a narrow edge of the front card in the card stack. The edge-wise pushing of the picker knife unit is not only limited, in practice, to the time when the cards are very new, crisp and straight-edged, but is also restricted to distinctly moderate feed rates, since the cards tend to warp and to jam when the knife edge impacts become truly rapid). The surface-engaging types of card pickers, thus far available, have had certain difficulties, which are overcome by this invention. For instance, when attempts were heretofore made to use very fast cycling of a feed member, such member often seemed to slide over the front card and the card did not move. Equally baffling were cases when cards issued from the stack at irregular speed or in skewed position.

I have found such trouble to be traceable to uncontrolled effects of card friction and card stack vibration. The invention overcomes this difficulty by a novel control for such friction and vibration. It may also advantageously utilize certain characteristics of a file of perforated computer cards. By these expedients the invention supplies cards, in a process of unusually high reliability as well as speed, to a card reader.

For a full description of the new system, reference will now be made to the appended drawing of a typical embodiment of the invention.

Figures 3, 4, 5:
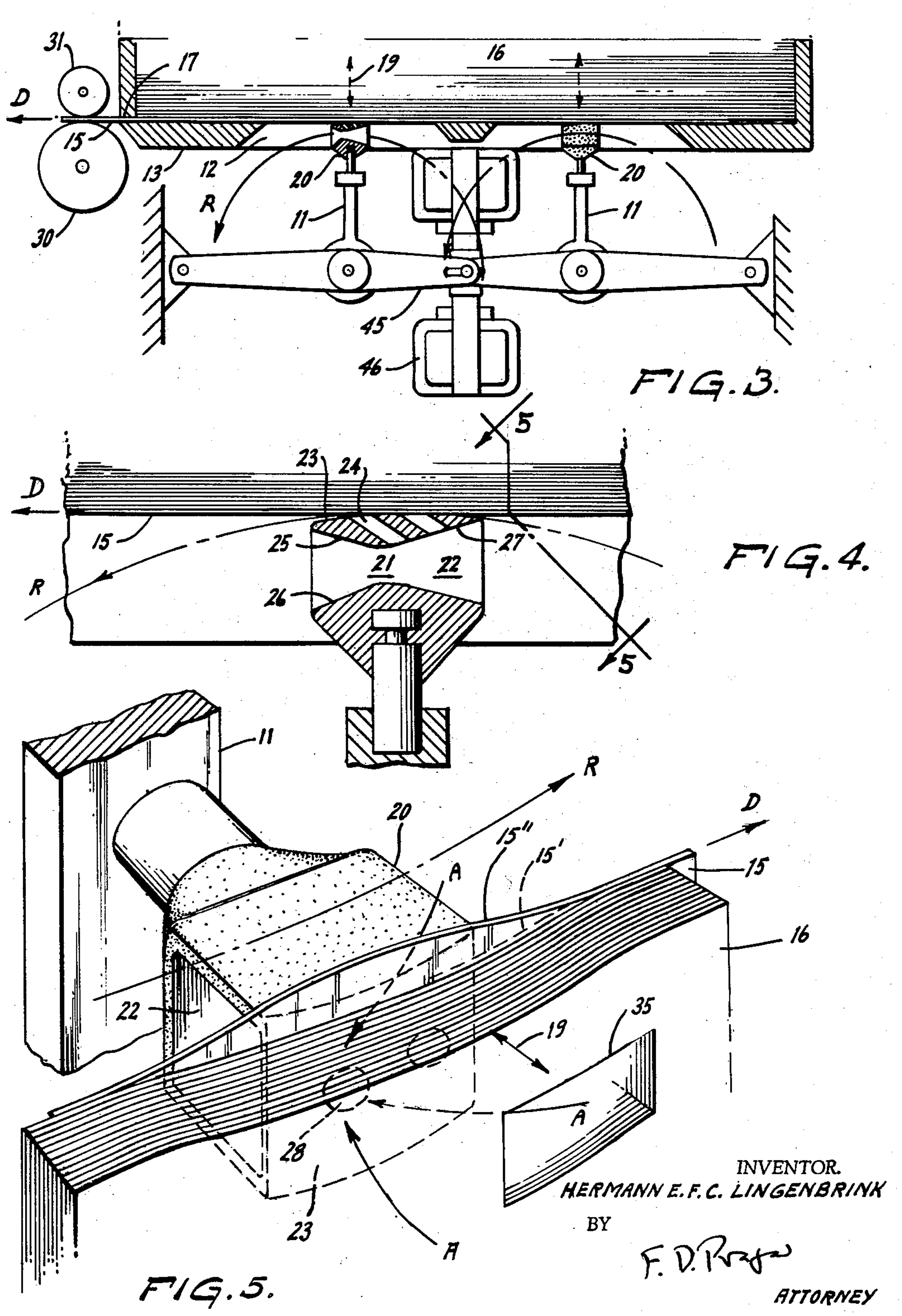

FIGURE 1 is a schematic plan view of a computer unit utilizing the invention. FIGURE 2 is a schematic perspective front view, showing the major card picking elements and movements on a larger scale. FIGURE 3 is a more enlarged plan view of the card feeder. FIGURE 4 is an additionally enlarged view of a detail from FIGURE 3. FIGURE 5 is a still larger, perspective view, taken approximately along line 5—5 in FIGURE 4.

Card feeder 10 is shown in FIGURE 1 as comprising a plurality and particularly a pair of travelling card picking mechanisms 11. Each card picker is mounted for arcuate motion into and from an aperture 12 in an end wall 13, at the front of card magazine or hopper 14. The feeders serve to move each successive card 15, in the plane of said card, away from the card stack or file 16 and into and through a slot or "throat" 17 formed in the magazine, for delivery into an electronic card reader. Subsequent portions of the card stack are moved toward front wall 13 in a relatively slow motion transverse of the cards and longitudinal of the stack. This latter motion is effected by a suitable loading or weighting mechanism 18 disposed at the rear end of magazine 14.

The invention serves to obtain a maximum of combined speed and reliability in the operation of card feeding device 11, that is, in accelerating front card 15 from rest position to transport speed. The feeding device performs a cyclic action which utilizes but controls longitudinal vibrations of the card stack.

The forward and rearward directions of said vibration, longitudinal of the card stack, are indicated in FIGURES 2 and 3 at 19. The vibratory motion is set up as the travelling contactor fingers 11 bring their card contacting tips 20 into cyclic contact with contact areas on the front cards of the card stack. Depending on the length of the card stack, and on its unpredictable rigidity or resilience (which in turn depends on the thicknesses of air films between cards, stiffness of cards, and other factors such as number of "bit" perforations per square inch), the cyclic contacts of the feeder tips cause greater or lesser vibrations of the card stack, particularly in said contact areas. Depending on the phase of such vibrations, the frictional pressures between feeder tips and card surfaces are likely to vary. Such variations have heretofore caused a major share of the aforementioned problems of irregular output speeds of the surface contacting card feeders.

The new card feeder overcomes this problem by means which include front card attracting apparatus, incorporated in each contactor tip. A preferred pneumatic kind of such apparatus is shown in FIGURE 4. It provides an orifice 21 and connected low pressure chamber 22, said chamber extending through tip 20 adjacent to and along the card-engaging surface 23 of the tip. By means of suction passage means 24, connecting the suction chamber to the tip surface, a region or field of low pressure is developed on said surface, when tip 20 travels.

The development of low pressure is also promoted by suitable aerodynamic design of the tip. For this purpose the tip has a relatively blunt, obliquely profiled front 25; this front can cooperate with a companion surface 26 to form an orifice 21 of venturi-like contour. A relatively pointed, tapering rear portion 27 defines a side wall of suction chamber 22. In cross-sectional outline, as indicated by FIGURE 5, this chamber is desirably given a rectangular shape. The tip surface is made in similar form but slightly larger and in such configuration as to obtain a certain degree of aerodynamic suction on the outer tip surface 23, when tip 20 travels in the direction of arrow R.

Low pressure is accordingly maintained on this outer surface 23, while tip 20 travels. The arrangement continuously draws air toward said surface, as schematically indicated by arrows A in FIGURE 5. Particularly low pressure prevails in the apertures 28 of the suction passages.

The consequent air suction insures proper contact between tip surface 23 and a front surface portion of each successive front card 15, when the tip approaches and reaches engagement with the card. Even in the presence of major vibratory excursions 19 of card stack portions, front card 15 is thus engaged in a firm, positive way.

Heretofore, in the absence of contactor suction apparatus, a rapidly travelling card feeder tip was accompanied by a wave of relatively high rather than low atmospheric pressure. This tended to counteract good engagement of the cards, not to promote it. Thus it aggravated the problem which under such conditions existed in the card stack.

According to the invention, by contrast, firm attraction of front cards to the card picker, for a limited time interval, is insured by the maintenance of an attractive force emanating from the card-contacting feeder surface and acting on the front cards.

FIGURE 5 shows, in full lines, an operative position of the new apparatus under a somewhat adverse condition. This position is established by one phase of a strong vibratory motion of card file 16, such vibratory motion occurring in a fundamental cycle which has the frequency of and is in phase with the cycle of feeder impacts. The illustration shows the cards, in the front portion of the file, at or near the end of that phase of their vibratory motion wherein they move away from path R of feeder tip 20, which they do during the time interval of closest approach by the feeder tip to the normal card-engaging position. The system is shown at the approximate moment when the vibration is about to carry the bulk of the card stack to be engaged to a relatively withdrawn position, just when the card engagement surface 23 of tip 20 reappears for engagement with front card 15.

The pneumatic suction maintained on the contact surface of the new feeder tip attracts the contact area of the front card, as soon as this feeder tip and surface reaches a position of close approach to the normal card engaging position thereof. While the contact portion of front card 15 is thus exposed to a brief application of subatmospheric pressure, normal atmospheric pressure continues to act on the card stack. Such normal pressure is also readily maintained within the body of the card stack, due to its data bit perforations 35 and due to the fact that the edges of the cards are freely exposed to the atmosphere in the card magazine. As a result, the contact portion of front card 15 is readily lifted from the body of card stack 16, during the short interval of proximity of tip 20. This front card moves rapidly, forwardly, through the minute distance from the vibratorily withdrawn position 15', shown in FIGURE 5, into the position shown at 15'', wherein it is—momentarily—held in contact with tip surface 23, by the atmospheric pressure acting on and in the card stack and particularly acting between the front card and the next following card.

Even if the maximum vibratory spacing between the contact surface elements be brought about by strong vibration of the card stack, such vibratory spacing is minor in comparison with the broad extension of the card surfaces and of the feeder tip surfaces, in the plane of their interengaging contact areas. In many cases the maximum of vibratory spacing of computer cards from the feed tips equals only the approximate thickness of one card, or that of a very few cards. Also, as indicated by FIGURE 5, the dimensions of contact areas 23 can be of substantially greater order of magnitude than the thicknesses and spacings of the cards in the card stack. As additionally shown by FIGURE 2, the aggregate height of feed tips 20 comprises a substantial portion of the width, or preferably of the length of an entire card, so that the combined area of the feed tips is also of substantial magnitude. The rapid motion of the card pickers creates an appreciable suction force in each orifice chamber 22 (FIGURE 4), and the aggregate effect of such suction forces is easily sufficient to effect the minute forward motion of the front card; that is, the suction force readily separates this card from the stack by a small fraction of an inch, particularly with the help of the permanent ample supply of air, at atmospheric pressure, to the other side of the front card. The drawings, and mainly FIGURE 2, exaggerate the thicknesses and the forward-backward separations of the cards. Under actual conditions, as typically encountered, these dimensions are hardly noticeable to the unaided eye.

FIGURE 2 uses schematic exaggeration as to the illustrated forward bending and lateral displacement of front card 15. Typically, feeders 11 are required only to "lift" the card forwardly by a fraction of a millimeter and to shift the card by a lateral distance of about one centimeter or less; thereafter, the transporting effort is taken over by other machinery, as will be noted presently.

When engagement between the feeder and the card has just been established, as aforesaid, and when the card is acceleated, by the feeder's rotary motion R, to the desired rapid transport velocity of the card, the card begins to move in a substantially straight-line direction D (which appears as oblique rearward movement, as seen in FIGURE 5, and leftward in FIGURES 1 to 4). As further indicated by FIGURE 3, front wall 13 of magazine 14 cooperates with the next following card to guide the front card 15 in the substantially straight line D, as desired, although feeder tip 20 moves in an arcuate line R. In due course, as this line R curves away from the cards, the suction is broken, and the feeder tip then releases the card to continue the substantially straight transport motion.

It is to be noted that the suction cup effect of the travelling tip, provided in accordance with the invention, is maintained throughout the operation of the card picker, although it is only temporarily applied to the cards. By this maintenance of the suction effect the invention differs from prior, pneumatic card straighteners and the like, wherein alternate atmospheric and subatmospheric pressures were established. Alternation between pneumatic pressures inherently leads to a time lag, and therefore to relatively low speed of the feeder, whereas the new device avoids such a lag and affords greatly increased rates of card dispensing operations.

The new method leads to good, effective card engagement, not only in the aforementioned case where the suction "lifts" a card from the stack, moving it between 15' and 15'' (FIGURE 5) but also in other operative conditions of the card stack. Assuming for instance that vibration is relatively minor but that successive cards have surfaces of very different coefficients of friction with the tip surface 23, substantially positive gripping of all cards to be handled is still achieved with the aid of the suction effect as described.

In other words, the cards are no longer subjected to unpredictable wiping effects as heretofore encountered. During each cycle the combined contacting and suction tip performs a rapid sub-cycle of operations wherein it attracts the front card for firm holding, positively propels the so attracted and held card, in sliding relation with the next following card, and then disengages the card by virtue of the fact that the tip travels on a curved line while the card is guided in a straight path. The so established subcycle of card engaging, card propelling, and card disengaging operations requires only a short arc of feeder travel, measuring for instance 15 degrees and occupying only about one millisecond when an entire cycle or 360 degree revolution of the feeder tip requires for instance 24 milliseconds. The feeder can then effect safe, regular feeding-out of 40 cards per second.

It will be noted that the invention does not attempt to prevent vibration of the card stack; it only counteracts adverse effects of such vibration, which have hitherto introduced hazards into the operation of frictional card feeders. In fact an advantage resides in the continuing freedom of the card stack (exclusive of the front card) to vibrate away from the feeder tips, as these tips contact the cards. The advantage is that the front card is exposed to relatively low frictional pressure on the back surface thereof, while being engaged positively and firmly on the front surface, during the time interval required to accelerate the card.

FIGURE 3 shows that a relatively short path, leading through slot 17 of the card magazine or hopper 14, suffices for the movement of each card incident to its initial acceleration by feeders 11. The leading edge of the card then passes through this slot or throat and promptly into engagement with a pair of adjacent transport rollers 30, 31. These rollers revolve permanently at a surface velocity commensurate with the desired speed of the card; they accordingly relieve the feed tips 20 of further duty, while said tips cycle around for engagement with a new card.

It is often preferable, as illustrated in FIGURES 1 to 3, to use tandem feeder units 11, arranged in the direction D of card travel. This arrangement reduces the required card-accelerating effect of each feeder unit to one-half of the total. As further shown in FIGURE 2, both rows of contactor tips 20 advantageously cover substantial portions of card surface area, extended transversely of the direction of card travel. It is, however, desirable in certain cases to interlace the feed tips with the positions of card perforations, or bits, as shown, so as to minimize irregularities of feed effect caused by unavoidable irregularity of bit distribution.

By further reference to FIGURE 1, it will be seen that systems 32, 33 of transport rollers can be provided in front of the electronic reading station 34, in order to make sure that each card continues to move at proper velocity and in proper orientation while the perforations or bits 35 of the card (FIGURE 2) are being scanned by the reader. The scanning can for instance be performed by optical devices including an illuminating unit 36 (FIGURE 1). A system of edge detector photocells 37 can be used for signalling the arrival of each new card and for thereby pulsing electronic reader circuits or the like, while a system of skew detector cells 38 can actuate automatic correction or interruption of the transport operation in case that some residual, oblique misalignment of a card is detected. Then follows the well known row of punch-hole reader cells or photo diodes 39, operating the electronic card reader circuits 40 of the computer.

It will be understood that terms such as computer and card reader are used herein in a broad sense. These terms include also business machines, data processors and the like. Machines can be constructed which apply the invention to the feeding and reading of magnetic cards. It is believed unnecessary to discuss details of associated circuits or components of the computer, such as the program circuits 41 or the input-output processor and associated units 42, which may for instance translate the card information into some form of buffer memory storage. It is similarly unnecessary to dwell on various mechanical accessories. For instance it will readily be seen that when the computer's use of cards must be interrupted for some reason, such as momentary or extended utilization of a tape input for units 42, instead of the input from card reader circuits 40, the feeding of any one or several cards or of the entire remaining card stack can readily be omitted or delayed, which can be done for instance by withdrawing the revolving tip and suction devices 20 from their operative position in front apertures 12 of magazine 14, by means of some mechanism 45 actuated by solenoid means 46 (FIGURE 3).

It is believed that the invention provides a new and novel combination of structural elements and operative steps in a feeder of the surface-engaging type, whereby the mechanical operation of the card reader can be performed with the same combined speed and reliability which has previously been attained for its electronic operation.

While only a single embodiment of the invention has been described, it should be understood that the details thereof are not to be construed as limitative of the invention, except insofar as is consistent with the scope of the following claims.

I claim:

1. A high speed card feeder, comprising: an apertured magazine structure for holding a card stack; rotor means including a card contactor; apparatus for rotating said rotor means to effect rotation of said contactor along a path leading into and along an aperture of said magazine structure for intermittent engagement with board surfaces of cards in said card stack; aspirator nozzle means incorporated in and movable with said contactor, the axis of said nozzle means extending along said path; and duct means leading from within the nozzle means to a surface portion of the contactor, said nozzle means being constructed and arranged to maintain, without the use of valves and external sources of suction and merely by said rotation of the contactor with the aspirator nozzle means incorporated therein, atmospheric suction on said surface portion and thereby, intermittently, on surfaces of cards in said card stack, for engagement of successive front cards in said stack and removal thereof from said magazine.

2. A card feeder comprising: an apertured magazine for a stack of cards; a pivotable rotor; a card surface contactor unit secured to said rotor for rotation in front of said stack; a series of open-ended venturi ducts in a peripheral portion of said unit and with their axes parallel to said peripheral portion; ducts from the throats of said venturi ducts to said peripheral portion; and means for continuously rotating said rotor and thereby said contactor unit and venturi ducts to intermittently engage an area of said unit with surfaces of cards in the front of said stack and, without valving and without application of other suction means, to maintain lower pneumatic pressure on a card contacting area of the contactor unit than in the magazine, for engagement of cards by said area.

References Cited in the file of this patent

UNITED STATES PATENTS

| | | |
|---|---|---|
| 1,681,413 | Kronqvist | Aug. 21, 1928 |
| 2,200,800 | Miller | May 14, 1940 |
| 2,770,458 | Halahan et al. | Nov. 13, 1956 |
| 2,862,709 | Labombarde | Dec. 2, 1958 |
| 2,979,329 | Cunningham | Apr. 11, 1961 |